United States Patent
Jenkins

(10) Patent No.: US 7,503,733 B2
(45) Date of Patent: Mar. 17, 2009

(54) SYSTEM, METHOD, AND APPARATUS FOR DRILL BIT ALIGNMENT AND DEPTH CONTROL WITH ERGONOMIC DRILL MOTORS

(75) Inventor: William L. Jenkins, Burleson, TX (US)

(73) Assignee: Lockheed Martin Corporation, Bethesda, MD (US)

(*) Notice: Subject to any disclaimer, the term of this patent is extended or adjusted under 35 U.S.C. 154(b) by 154 days.

(21) Appl. No.: 11/505,565

(22) Filed: Aug. 17, 2006

(65) Prior Publication Data

US 2008/0044243 A1    Feb. 21, 2008

(51) Int. Cl.
B23B 49/02    (2006.01)

(52) U.S. Cl. .......................... 408/97; 408/110

(58) Field of Classification Search .......... 408/97, 408/1 R, 72 B, 115 B, 115 R, 95, 96, 241 B, 408/239 A, 110, 112; 279/143
See application file for complete search history.

(56) References Cited

U.S. PATENT DOCUMENTS

| | | | |
|---|---|---|---|
| 1,665,173 A | | 4/1928 | Misener |
| 1,699,870 A | | 1/1929 | Black et al. |
| 1,831,813 A | * | 11/1931 | Levedahl .................... 408/81 |
| 2,246,916 A | * | 6/1941 | Fischer ...................... 408/56 |
| 2,335,614 A | * | 11/1943 | Spievak ...................... 408/84 |
| 2,376,432 A | | 5/1945 | Henson |
| 2,461,716 A | * | 2/1949 | Blatt ........................ 408/112 |
| 2,539,223 A | * | 1/1951 | Bellek ....................... 408/112 |
| 2,706,918 A | * | 4/1955 | Blatt ......................... 408/51 |
| 2,792,726 A | * | 5/1957 | Vick ......................... 408/81 |
| 3,776,647 A | | 12/1973 | Hart |
| 4,209,069 A | * | 6/1980 | Smith ........................ 173/75 |
| 4,329,092 A | * | 5/1982 | Ponitzsch et al. ............. 408/11 |
| 5,356,245 A | * | 10/1994 | Hosoi et al. ................. 408/56 |
| 5,564,717 A | | 10/1996 | Alberts |
| 5,649,793 A | * | 7/1997 | Ericksen et al. .............. 408/81 |
| 5,947,654 A | * | 9/1999 | Blankenship et al. ...... 408/72 B |
| 6,503,029 B1 | * | 1/2003 | Ende et al. ................. 408/1 R |
| 7,073,989 B2 | * | 7/2006 | Erickson et al. .............. 408/97 |
| 7,175,371 B2 | * | 2/2007 | Vidal ....................... 408/1 R |

OTHER PUBLICATIONS

Downey, Drill and Router Guides, Value from United!, Pressure Foot Drilling Systems, United, May 26, 2004, C1-C22, Downey, CA.

* cited by examiner

*Primary Examiner*—Daniel W Howell
(74) *Attorney, Agent, or Firm*—Bracewell & Giuliani LLP

(57) ABSTRACT

A system, method, and apparatus for the rigid alignment of drill bits with ergonomic drill motors is disclosed. An adjustable nosepiece adapter is mounted to the ergonomic drill motor adjacent the drill bit chuck. The adapter has a split clamp portion on its distal end for receiving a pressure foot. A guide bushing fits in the proximal end of the pressure foot. A coil spring is located in the pressure foot and allows the guide bushing to telescope within the pressure foot. The drill bit extends through the guide bushing, pressure foot, and adapter and is secured to the chuck. The distal end of the guide bushing fits closely within a hole in a template that is secured to the workpiece to provide holes that are more accurately formed in the workpiece.

8 Claims, 4 Drawing Sheets

SYSTEM, METHOD, AND APPARATUS FOR DRILL BIT ALIGNMENT AND DEPTH CONTROL WITH ERGONOMIC DRILL MOTORS

BACKGROUND OF THE INVENTION

1. Technical Field

The present invention relates in general to the support and alignment of drill bits on drill motors and, in particular, to an improved system, method, and apparatus for the alignment of drill bits with nosepieces on ergonomic drill motors.

2. Description of the Related Art

In the manufacturing industry it is very common to form holes in workpieces to facilitate assembly of products. Holes are typically formed by using drilling equipment, such as hand-held drill motors, which are equipped with drill bits that are appropriate for the job. In some applications, a template or guide plate is used to assist drill operators in precisely locating the various positions of the holes to be drilled in the workpiece. For example, a guide plate may be complementary in shape and contoured to the workpiece to be drilled. A guide plate can have hundreds of alignment holes for the drill operator to use or "go by" to form drill holes in the workpiece. With the guide plate positioned directly adjacent or mounted to the workpiece, the drill operator pushes the rotating drill bit through each pre-formed hole in the guide plate to form the holes in the workpiece in their proper locations.

This process is somewhat prone to operator error. First, the drill bits are not always axially aligned at a proper angle of insertion (i.e., perpendicular to the surface of the workpiece) as the holes are formed. This error can lead to off-axis cylindrical holes being formed, and holes that are over bored in diameter as the drill operator tries to manually maintain axial alignment. Second, the depth of drill bit insertion can be improperly varied by drilling a hole that is too deep or too shallow in the workpiece, which can cause damage to underlying structure or render the hole inadequate for its intended purpose. Each of these errors can require extensive rework operations to repair the damage and increase waste.

In the prior art, drill bit alignment or "Sheridan" equipment is well known for facilitating more accurate hole drilling on large drilling equipment. Sheridan equipment attaches to the end of large drill motors to help maintain axial alignment of the drill bits and limit the depth of drill bit insertion. Other types of drill attachments are also known. See, e.g., U.S. Pat. Nos. 1,665,173; 1,699,870; 2,376,432; 3,776,647; and 5,564,717. Unfortunately, none of these prior art designs are adjustable and have only a limited range of operation.

Moreover, Sheridan-type equipment is completely incompatible with modern ergonomic drilling equipment, which is much smaller and far more ergonomically efficient than any prior art designs. Furthermore, equipment manufacturers have been unable to overcome the alignment and depth penetration problems that are common to the industry. Drill operators have attempted to hold an ergonomic drill in one hand and a Sheridan-type tool in their other hand in an attempt to facilitate alignment and depth control of their drill bits. However, the holes drilled by this manually-intensive process are inconsistent at best and wear out drill bits at a rapid rate. Thus, it has been a long felt need in the industry to provide ergonomic drilling equipment with drill bit alignment and depth control of the holes formed in workpieces.

SUMMARY OF THE INVENTION

One embodiment of a system, method, and apparatus for the rigid alignment of drill bits with ergonomic drill motors and a method of feed control of the drill bit while retaining the necessary ergonomics involved with hand drilling. The invention overcomes the misalignment and misdrilling problems of the prior art. An adjustable nosepiece adapter is mounted to the ergonomic drill motor and comprises a sleeve and lock nut. The adapter is axially adjustable relative to the drill motor to accommodate drill bits of different length. A drill bushing is mounted to an opposite end of the nosepiece adapter to act as a drill guide for drill bit alignment and feed control with respect to workpieces.

In one embodiment, the adapter mounts to the ergonomic drill motor adjacent the chuck for mounting the drill bit. The adapter has a split clamp portion on its distal end for receiving a pressure foot. A guide bushing fits in the proximal end of the pressure foot. A coil spring is located in the pressure foot and allows the guide bushing to telescope within the pressure foot. The drill bit extends through the guide bushing, pressure foot, and adapter and is secured to the chuck. The distal end of the guide bushing fits closely within a hole in a template that is secured to the workpiece to provide holes that are more accurately formed in the workpiece.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
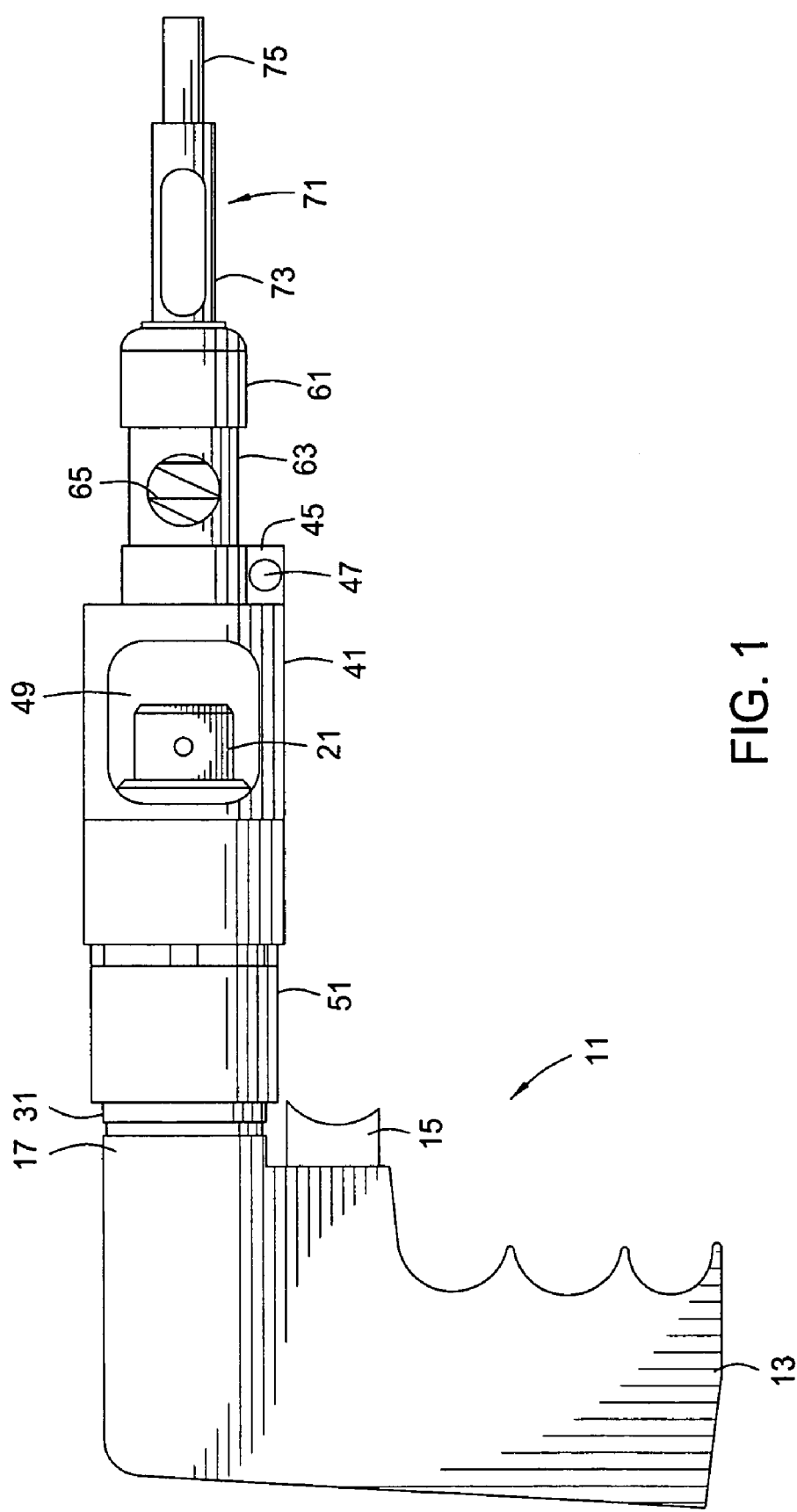
FIG. 1 is a partially-sectioned, isometric view of one embodiment of a drill motor assembly constructed in accordance with the invention.
Figure 2:
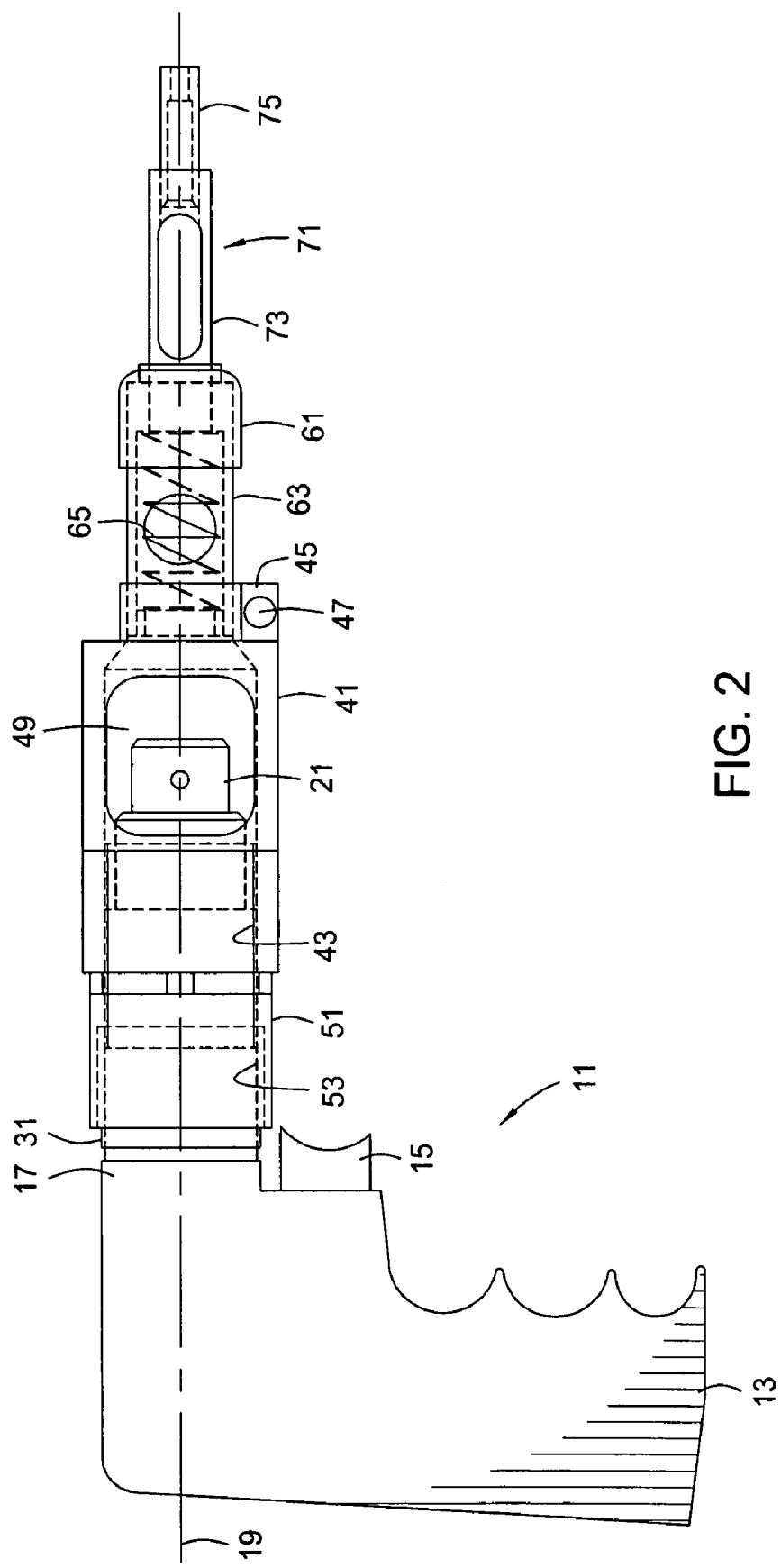
FIG. 2 is a sectional side view of the drill motor assembly of FIG. 1 and is constructed in accordance with the invention.

Referring to FIGS. 1-4, one embodiment of a system, apparatus, and method for controlling and aligning drill bits on ergonomic drill motors is disclosed. An ergonomic drill motor assembly according to one embodiment of the invention comprises a drill 11 having a drill body, such as a handle 13 (e.g., a pistol grip), containing a motor and a switch or trigger 15 for actuating the motor. Such drills typically comprise pneumatic-driven motors. The drill body also may comprise a housing 17 that extends from the handle 13 along a drill axis 19. A chuck 21 extends from the housing 17 along the drill axis 19 and is rotated by the motor for drilling purposes. The chuck 21 releasably supports a drill bit 23 (FIG. 3) such as those known in the art.

Figure 3:
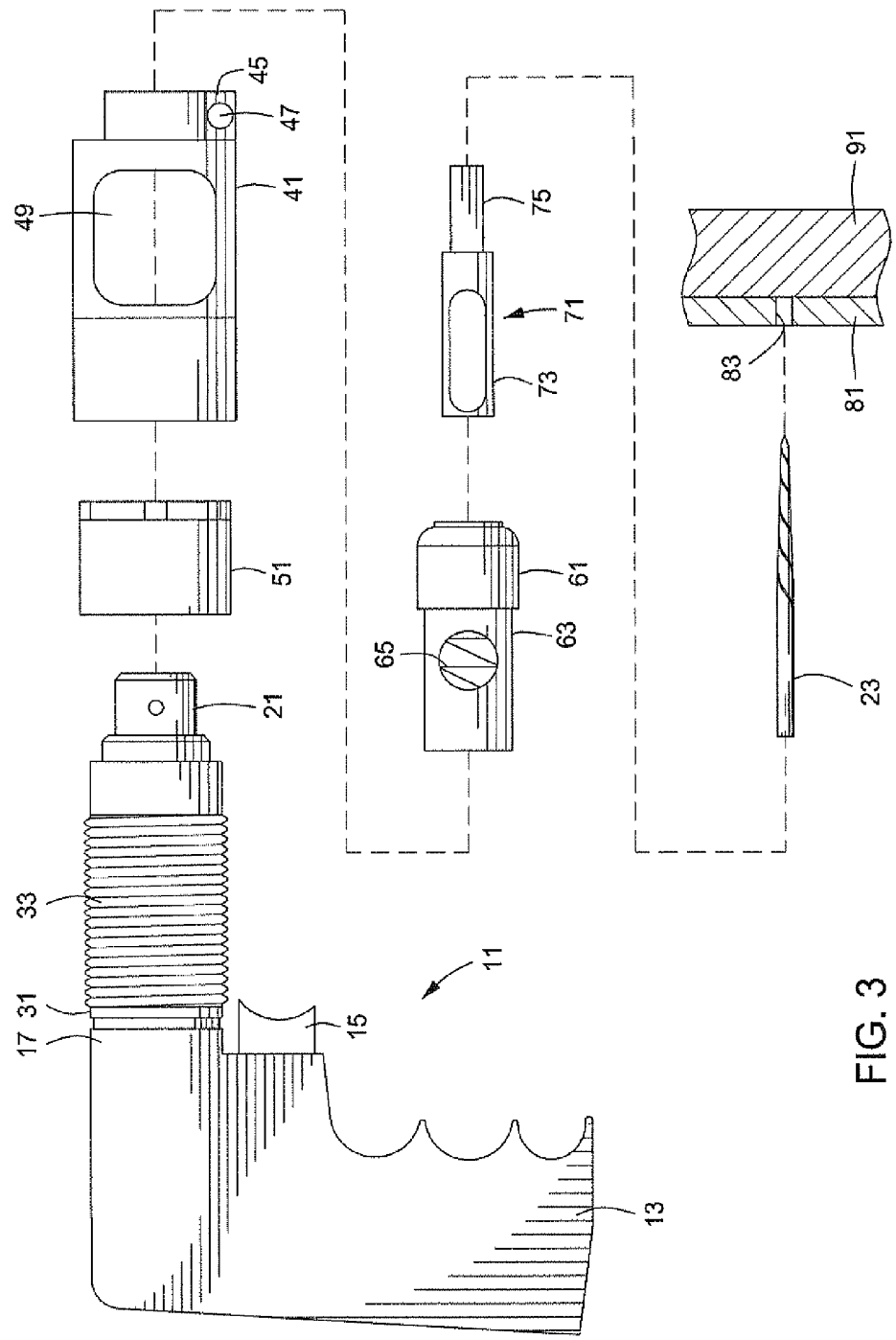
FIG. 3 is an exploded side view of the drill motor assembly of FIG. 1 in operation and is constructed in accordance with the invention.

As best shown in FIG. 3, a cap 31 is mounted to the housing 17 adjacent to and circumscribing the chuck 21. The cap 31 may provide a number of functions including, for example, capturing bearings and/or providing a seal for the drill motor, as well as extending the protective housing of the drill motor and chuck. In one embodiment, the cap 31 is provided with an external thread 33 or other types of fasteners that may be used for axial adjustment purposes as will be described below. The external thread 33 may have an axial length of about half an inch to two inches, but may typically comprise a length of about one inch.

A coupling 41 is mounted to the cap 31 and, in one embodiment, has a complementary axial adjustment feature such as an internal thread 43. Internal thread 43 engages the external thread 33 on the cap 31 and supports the coupling 41 on the drill 11 in a variable axial position by rotating coupling 41 relative to cap 31. In one embodiment, the external thread 33 on the cap 31 are completely covered by the coupling 41 and a lock nut 51 regardless of an axial position thereof, such that the external thread 33 are only contacted by the coupling 41 and the lock nut 51 and is not exposed to incidental contact that could damage thread 33.

Like coupling 41, the lock nut 51 may be equipped with an axial adjustment feature such as an internal thread 53 for engaging the external thread 33 on the cap 31. The cap 31 supports the lock nut 51 on the drill 11 in a variable position. The lock nut 51 releasably abuts the coupling 41 to lock the coupling 41 from axial movement relative to the drill 11.

The coupling 41 further comprises a retainer 45 that is adapted to support a conventional pressure foot 61 and drill bit bushing 71 for enhancing axial alignment of the drill bit 23. In one embodiment, the retainer 45 on the coupling 41 comprises a split clamp on a distal end of the coupling 41 and has a screw 47 for adjusting a diameter of the split clamp to releasably secure the pressure foot 61 to the coupling 41. The coupling 41 may further comprise a plurality of windows 49 (e.g., three shown) formed therein adjacent the chuck 21 for removing chips produced from drilling a workpiece 91 (FIG. 3). A template or guide plate 81 having a pre-formed hole 83 may be used to locate the hole-to-be-drilled in the workpiece 91.

In another embodiment, the pressure foot 61 comprises a holder 63 having a spring 65 for limiting a feed rate and controlling a depth of the drill bit 23. The drill bit bushing 71 may comprise an adapter 73 mounted to and axially movable relative to the holder 63, and a sleeve 75 extending from the adapter 73 for circumscribing the drill bit 23.

Figure 4:
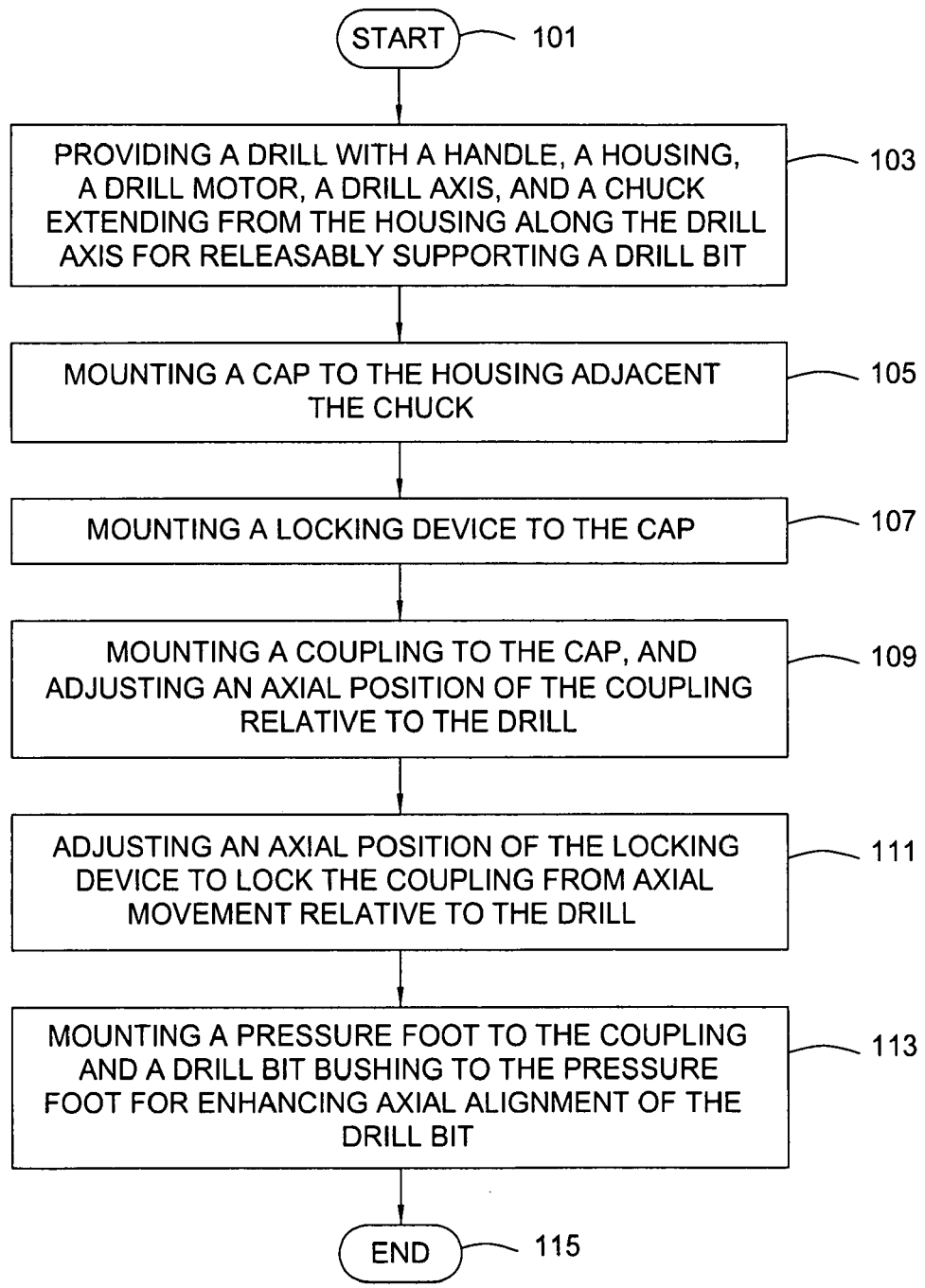
FIG. 4 is a high level flow diagram of one embodiment of a method constructed in accordance with the invention.

Referring now to FIG. 4, the invention also may comprise a method of adjusting a drill. In one embodiment, the method begins as indicated at step 101, and may comprise providing a drill with a handle, a housing, a drill axis, and a chuck extending from the housing along the drill axis for releasably supporting a drill bit (step 103); mounting a cap to the housing adjacent the chuck (step 105); mounting a lock nut to the cap (step 107); mounting a coupling to the cap, and adjusting an axial position of the coupling relative to the drill (step 109); adjusting an axial position of the lock nut to releasably abut the coupling to lock the coupling from axial movement relative to the drill (step 111); mounting a pressure foot to the coupling and a drill bit bushing to the pressure foot for enhancing axial alignment of the drill bit (step 113); before ending as indicated at step 115. Other alternate embodiments of steps and features of the method may incorporate elements such as those described above for the system and apparatus of the invention.

While the invention has been shown or described in only some of its forms, it should be apparent to those skilled in the art that it is not so limited, but is susceptible to various changes without departing from the scope of the invention.

What is claimed:

1. An adjustment assembly for a drill having a body, a drill motor mounted in the body, a drill axis, and a chuck extending from the body along the drill axis for releasably supporting a drill bit, the adjustment assembly comprising:
   a cap adapted to be mounted to the body adjacent the chuck and having an external thread;
   a coupling having an internal thread for engaging the external thread on the cap and supporting the coupling on the drill in a variable axial position;
   a lock nut having an internal thread for engaging the external thread on the cap and supporting the lock nut on the drill in a variable axial position, the lock nut releasably abutting the coupling to lock the coupling from axial movement relative to the drill; wherein
   the external thread on the cap is completely covered by the coupling and the lock nut regardless of an axial position thereof, such that the external thread is contacted only by the coupling and the lock nut and is not exposed to incidental contact; and the coupling further comprises:
   a retainer for supporting a pressure foot and drill bit bushing for enhancing axial alignment of the drill bit, the pressure foot comprising a holder having a spring for limiting a feed rate and controlling a depth of the drill bit, and the drill bit bushing comprises an adapter mounted to and axially movable relative to the holder, and a sleeve extending from the adapter for circumscribing the drill bit.

2. An adjustment assembly according to claim 1, wherein the retainer on the coupling comprises a split clamp on a distal end of the coupling and has a screw for adjusting a diameter of the split clamp to releasably secure the pressure foot to the coupling, and the coupling further comprises a plurality of windows formed therein adjacent the chuck for removing chips produced from drilling a workpiece.

3. An adjustment assembly according to claim 1, wherein an axial length of the external thread on the cap is about one inch.

4. An ergonomic drill motor assembly, comprising:
   a drill having a handle, a housing, a drill motor, a drill axis, and a chuck extending from the housing along the drill axis for releasably supporting a drill bit;
   a cap mounted to the housing adjacent the chuck and having an external thread;
   a coupling having an internal thread for engaging the external thread on the cap and supporting the coupling on the drill in a variable axial position, the coupling further comprising a retainer that is adapted to support a pressure foot and drill bit bushing for enhancing axial alignment of the drill bit; and
   a lock nut having an internal thread for engaging the external thread on the cap and supporting the lock nut on the drill in a variable position, the lock nut releasably abutting the coupling to lock the coupling from axial movement relative to the drill; and wherein
   the retainer on the coupling comprises a split clamp on a distal end of the coupling and axially distal to the chuck, the split clamp having a screw for adjusting a diameter of the split clamp to releasably secure the pressure foot to the coupling, and the coupling further comprises a plurality of windows formed therein adjacent the chuck for removing chips produced from drilling a workpiece.

5. An ergonomic drill motor assembly according to claim 4, wherein the external thread on the cap is completely covered by the coupling and the lock nut regardless of an axial position thereof, such that the external thread is contacted only by the coupling and the lock nut and is not exposed to incidental contact.

6. An ergonomic drill motor assembly according to claim 4, wherein an axial length of the external thread on the cap is about one inch.

7. An ergonomic drill motor assembly according to claim 4, wherein the pressure foot comprises a holder having a spring for limiting a feed rate and controlling a depth of the drill bit, and the drill bit bushing comprises an adapter mounted to and axially movable relative to the holder, and a sleeve extending from the adapter for circumscribing the drill bit.

8. An ergonomic drill motor assembly, comprising:
- a drill having a handle, a housing, a drill motor, a drill axis, and a chuck extending from the housing along the drill axis for releasably supporting a drill bit;
- a cap mounted to the housing adjacent the chuck and having an external thread;
- a coupling having an internal thread for engaging the external thread on the cap and supporting the coupling on the drill in a variable axial position, the coupling also having windows formed therein adjacent the chuck for removing chips produced from drilling a workpiece;
- a pressure foot and drill bit bushing supported by the coupling for enhancing axial alignment of the drill bit, the pressure foot having a spring for limiting a feed rate and controlling a depth of the drill bit, and the drill bit bushing that is mounted to and axially movable relative to the pressure foot, and a sleeve extending from the drill bit bushing for circumscribing the drill bit;
- a split clamp on a distal end of the coupling and axially distal to the chuck, the split clamp having a screw for adjusting a diameter of the split clamp to releasably secure the pressure foot to the coupling; and
- a lock nut having an internal thread for engaging the external thread on the cap and supporting the lock nut on the drill in a variable position, the lock nut releasably abutting the coupling to lock the coupling from axial movement relative to the drill, and the external thread on the cap is completely covered by the coupling and the lock nut regardless of an axial position thereof, such that the external thread is contacted only by the coupling and the lock nut and is not exposed to incidental contact.

* * * * *